_United States Patent_ [19]

Gutton et al.

[11] 3,719,947

[45] March 6, 1973

[54] METHOD OF AND DEVICE FOR DETECTING SUBMERGED BODIES BY MEANS OF MEGAMETER RADIO WAVES

[76] Inventors: Henri Gutton, 134, rue Perronet, Seine, France; Jean Jacques Hugon, deceased, late of 21, rue de Belfort, Asnieres, Siene, France by Simone Jeanne Georgette Hugon, heir; Marie Jeanne Augarde, 16, rue du Poste, Sainte-Barnabe-Marseille, Bouches-du-Rhone, France; Emile Hugon, 22, rue de Dinkergue, Casablanca, Morocco heirs

[22] Filed: June 21, 1961

[21] Appl. No.: 119,253

[30] Foreign Application Priority Data

July 7, 1960 France..............................60832275

[52] U.S. Cl......................343/112 R, 343/7, 340/4, 324/6
[51] Int. Cl...............................................G01s 3/02
[58] Field of Search.........340/3, 4; 324/5, 6; 343/10, 343/12, 13, 7, 112 D; 250/3, 4, 5

[56] References Cited

UNITED STATES PATENTS

| | | | |
|---|---|---|---|
| 1,322,622 | 11/1919 | Rodgers et al. | 340/4 X |
| 1,377,129 | 5/1921 | Hahnemann | 340/4 X |
| 1,838,371 | 12/1931 | Deardorff | 324/6 |
| 2,513,279 | 7/1950 | Bradley | 343/7 |
| 2,659,882 | 11/1953 | Barret | 324/6 |

Primary Examiner—Benjamin A. Borchelt
Assistant Examiner—S. C. Buczinski
Attorney—Waters, Roditi & Schwartz

[57] ABSTRACT

A method of detecting bodies which are submerged into a liquid mass, by means of megameter radio waves generating on the surface of said liquid mass a plurality of electric fields slightly inclined in their propagation direction and the horizontal component of which vertically propagates inwardly of said liquid mass, which consists in transmitting at the surface of the liquid mass megameter radio waves of the aforementioned character, simultaneously receiving in a plurality of receiving stations spaced from each other said emitted waves and the waves obtained by reflection, on a submerged obstacle to be detected, of the vertically propagated horizontal component of the electric field existing in vertical alignment with said obstacle, determining at each receiving station the included angle formed by the lines joining said station to the wave emission and to the obstacle, measuring at the receiving stations for which said included angle is comprised between 60° and 120°, on the one hand, the phase-shift between the emitted and reflected waves and, on the other hand, the bearing angle formed by the direction for which the reception of the reflected waves is maximum and a stationary direction which is similar for all the receiving stations determining by the crossbearing method the geographical position of said obstacle by utilizing the thus measured bearing angles, and computing the depth of said obstacle from said measured phase-shift.

16 Claims, 13 Drawing Figures

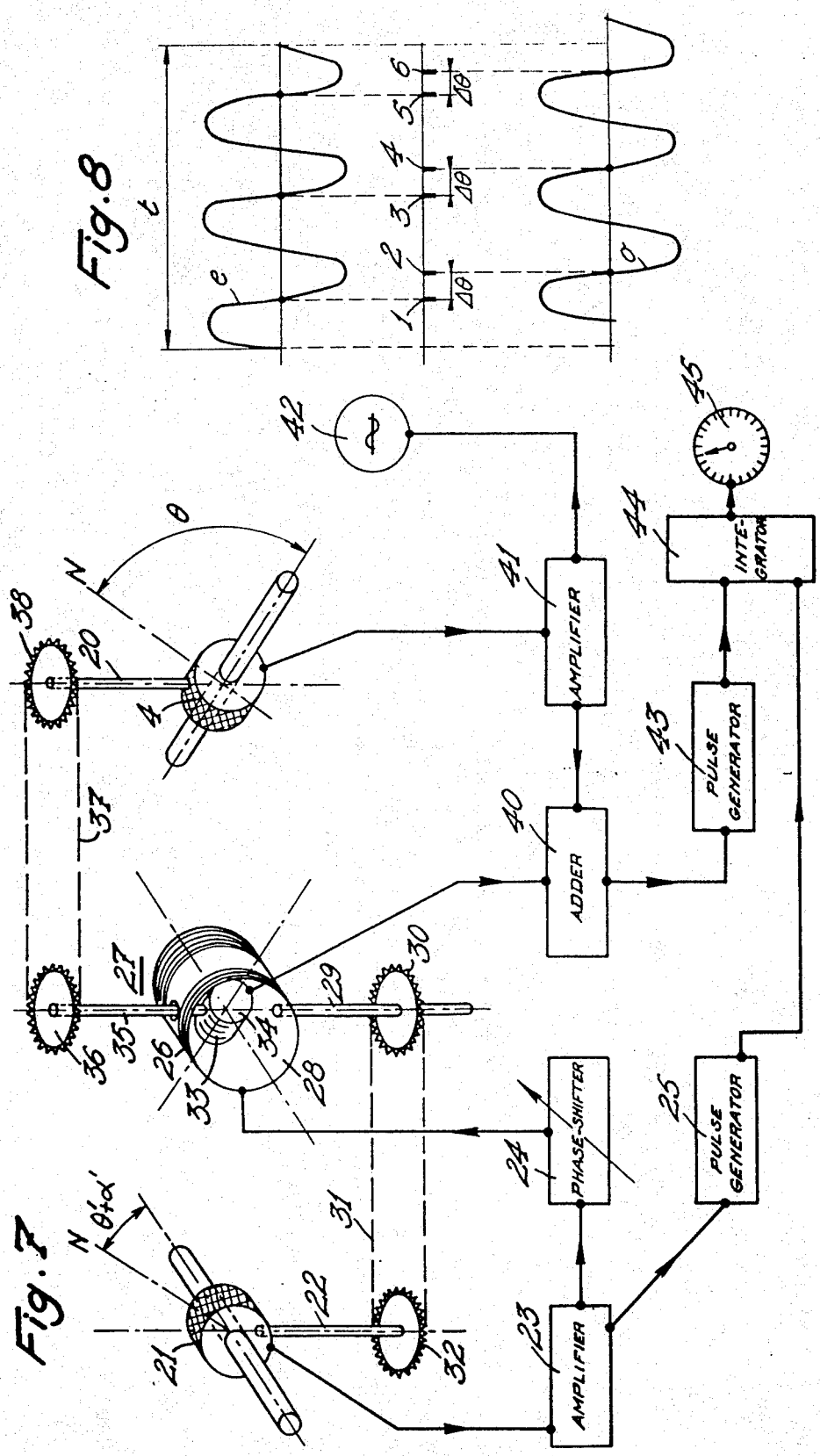

3,719,947

METHOD OF AND DEVICE FOR DETECTING SUBMERGED BODIES BY MEANS OF MEGAMETER RADIO WAVES

The present invention relates to a method of and device for detecting submerged bodies by means of megameter radio waves, examples being metallic bodies such as submarines.

The invention has for main object to provide a method of detecting submerged bodies, whereby megameter waves are transmitted at the surface of a body of water, the maximum amplitude of the echo produced by the horizontal component of the electrical field of these waves after reflection off the submerged body is received directionally by at least two receiving stations distant from each other while the lines joining said stations to the transmitter and to the detected body form an included angle comprised between 60° and 120°, to obtain the geographical position of the submerged body by intersection, and the phase displacement existing between said echo horizontal component and the transmission field is measured to determine the depth of the submerged body.

In a preferred application of the method described above, several different transmission frequencies are used and differently phase-displaced signals are received, in such a way that the transmitting stations may be placed in proximity to one another without causing mutual jamming.

The invention further has for its object to provide a group for detecting submerged bodies and for performing the method described hereinabove, comprising one or more megameter-wave transmitting stations each of which consists of a device for generating high power energy at the utilization wavelength or wavelengths and of a submerged radiating system in conjunction with a multiplicity of receiving stations each of which is equipped with two directive receiving antenna loops, respectively orientated towards the transmitter and towards the detected obstacle and both connected to a depthwise graduated phasemeter by means of an electrical connection comprising an assembly of devices which renders null the electromotive force induced by the transmitting station in the loop antenna orientated towards the obstacle provided that the lines which join the receiving station to the transmitting station and to the obstacle, respectively, form an included angle comprised between 60° and 120°.

The transmission antenna of each transmitting station is preferably of the type described in the U.S. Pat. application Ser. No. 122,367 filed by the applicants on May 31, 1961 in respect of "Method and device for radiating megametric radio waves".

The invention still further has for its object all industrial applications of the method and device for detecting submerged bodies as hereinbefore described, and in particular for the detection of underwater obstacles or bodies in motion, such as submarines, torpedos or minefields.

The description which follows with reference to the accompanying drawings given by way of example and not of limitation will give a clear understanding of how the invention may be performed and will bring out yet further particularities thereof.

In the drawings,

FIG. 7 is a highly diagrammatic illustration of a receiver in accordance with the invention.

FIG. 8 shows the phase displacement between the megameter wave emitted by the transmitter in FIG. 4 and the wave reflected by the obstacle and received by the receiver in FIG. 7.

Figure 12:
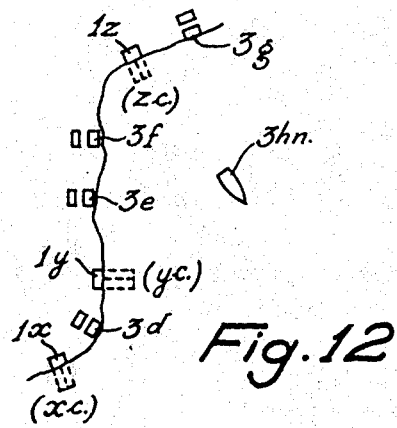

FIG. 12 schematically represents a plurality of detection groups comprising transmitting stations operating at different frequencies.

The method and devices forming the objects of the present invention use megameter radio waves emitted by means of an antenna of the type described in the U.S. Pat. application Ser. No. 122,367 filed by Applicants on May 31, 1961.

Figure 2:
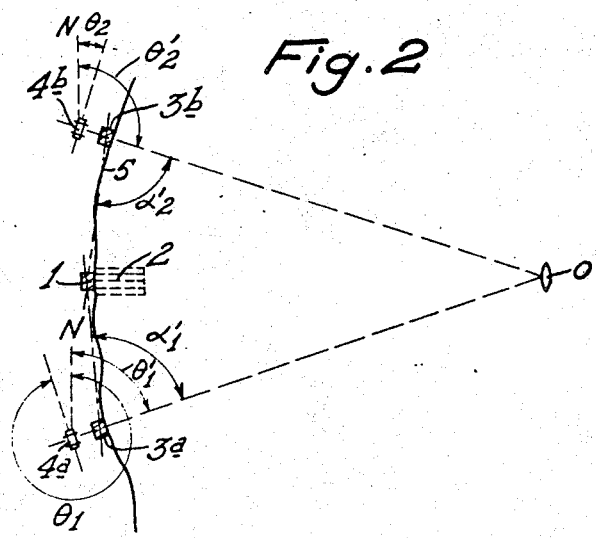
FIG. 2 is a schematic diagram showing a detection group comprising a land transmitting station and receiving stations, in accordance with the invention.
Figure 3:
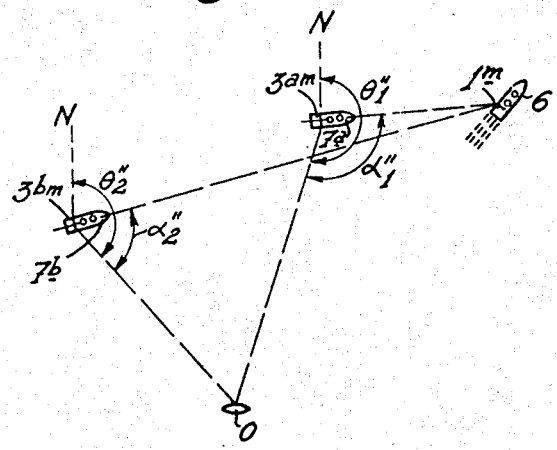
FIG. 3 is a schematic diagram showing a detection group comprising a seagoing transmitting station and receiving stations, in accordance with the invention.
Figure 9:
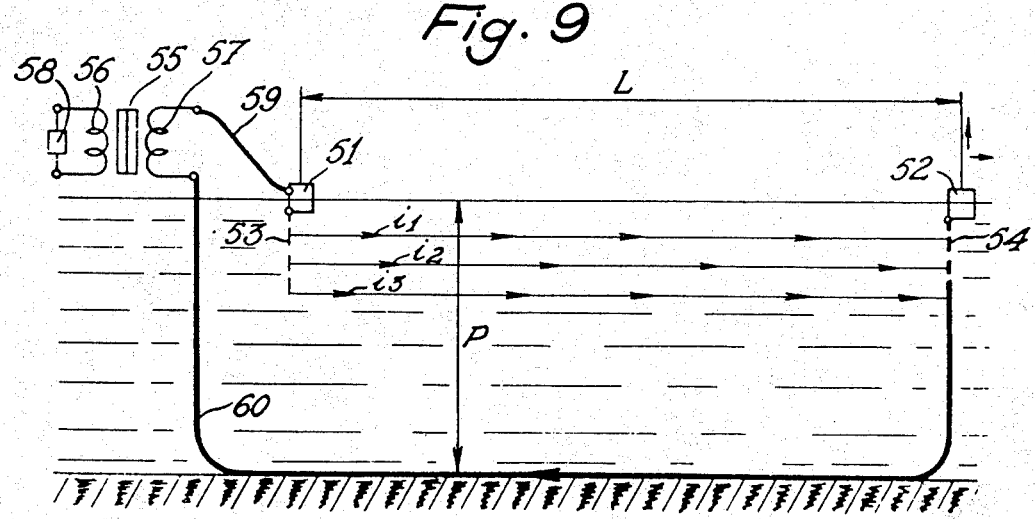
FIG. 9 is a schematic illustration of a submerged megameter-wave antenna of the type described in U.S. Pat. application No. 122,367 filed by Applicants on May 31, 1961.

As illustrated in FIG. 9, which reproduces FIG. 2 of said Patent Application, such an antenna comprises two floats 51, 52 positioned on the surface of the sea, distant by L kilometers from each other and respectively supporting fully immersed large-size electrodes 53, 54 consisting of grids. There is established between said grids 53, 54 an alternating difference of potential, at a very low frequency ranging from 1 to 100 c/s, by means of a transformer 55 the primary and secondary windings 56 and 57 of which are designed to fully match the load represented by the impedance existing across said grids 53, 54 and the source of alternating current 58.

Under the effect of the electromotive force developed in the secondary winding 57, a current is established in the sea across the grids 53 and 54 in the form of streams parallel to the surface, such as $i1, i2, i3$. These current streams are channeled by insulated cables 59, 60, of which one, the cable 59 connected to the grid 53 which is nearest to the transformer 55, runs above the surface of the sea, while the other, the cable 60 connected to the grid 54, runs along the sea-bed, at a distance P from the surface.

In practice, this depth P will be of the order of some tens of meters. Under such conditions, the current streams i become comparable to the streams of current circulating in an antenna, and the energy radiation produced by said current streams will not be attenuated by the oppositely directed radiation produced by the immersed cable 60.

Since the length of the current streams i (a few kilometers) is always very small in comparison with the wavelengths used (several megameters) the radiation resistance of such an antenna is low yet nevertheless sufficient to give rise to considerable radiated power in response to currents of high intensity.

Figure 10:
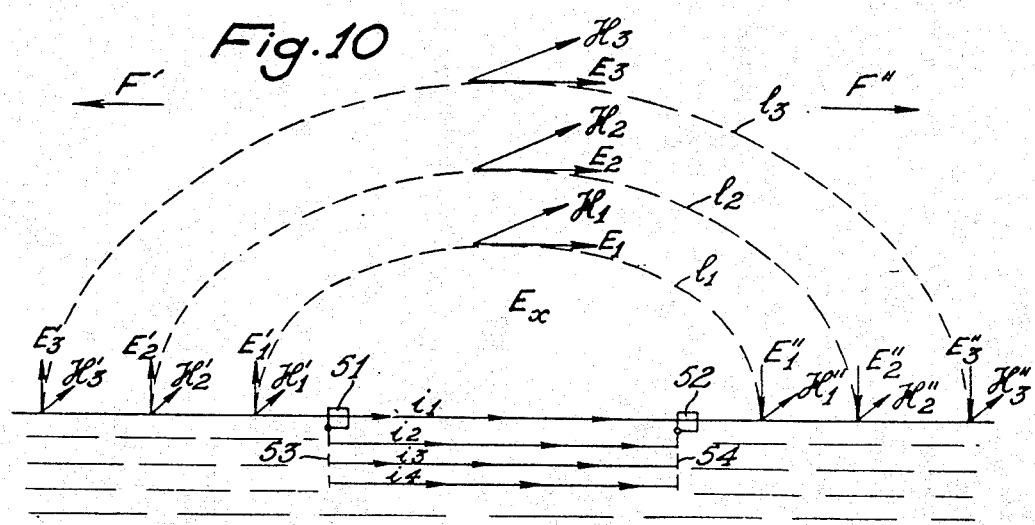
FIG. 10 is an explanatory diagram showing the generation and propagation of the electromagnetic waves generated by the submerged antenna of FIG. 9.

FIG. 10 shows how, whereas the current streams are horizontal, a vertical electrical field may be formed with this type of antenna. The stream i parallel to the surface of the sea set up an electrical field E parallel thereto and parallel to a magnetic field $H$ which is perpendicular to the plane of the figure and likewise parallel to the water surface. The lines of force $l1$, $l2$, $l3$ of the electrical field E curve across the two ends of the antenna since, due to the fact that the wavelength is much greater than the length of the antenna, the lines of force of said electrical field E form into semi-circles above the current streams, as is well known to radio engineers. Thus the line of force $l1$ produces two electrical fields $E'_1$ and $E''_1$, the line of force $l2$ two fields $E'_2$, $E''_2$, the line of force $l3$ two fields $E'_3$, $E''_3$, and so on. The fields E' and E'', which are opposite to each other, travel only outwardly from the antenna, along F' and F'' respectively, while slightly inclined in the direction of propagation, and do not interfere with each other any more than the magnet fields H' and H''.

The electromagnetic wave related to each electrical field $E_1$, $E_2$... propagates as a light wave and the antenna acts as a beacon, the light beams of which skim along the surface of the sea.

When considering a point A on the surface of the sea (FIG. 11), a ray $r_i$ of the incident wave emitted by the antenna and which falls on a medium having a high index of refraction, enters the sea water and refracts along the line $n$ substantially perpendicular to the surface of the sea. The speed of propagation of said ray changes from about 300,000 km/s in the air to about 1,600 m/s in the sea water for a frequency equal to 1 c/s.

If said refracted ray $n$ falls on an obstacle said ray diffracts. The diffracted rays $r_{di}$ which are highly inclined with respect to the surface of the sea are submitted to a total reflection and does not pass through said surface.

On the contrary a diffracted ray such as $r_d$ which attains the surface of the sea according to an incidence substantially perpendicular to said surface traverses said surface and is submitted to a refraction. The refracted ray $r_r$ skims along the surface of the sea due to indexes of refraction of sea and air.

Therefore, the point A acts as a supplementary beacon the light beams of which skim along the surface of the sea, like the main source consisting of the antenna. The time of vertical propagation of ray $n$ and $r_d$ through the sea water being very important with respect to that of ray $r_i$ through the air, even for small depths, owing to the low speed of propagation of very low frequencies through the sea, the phase of refracted ray $r_r$ is shifted with respect to that of initial ray $r_i$.

Figure 11:
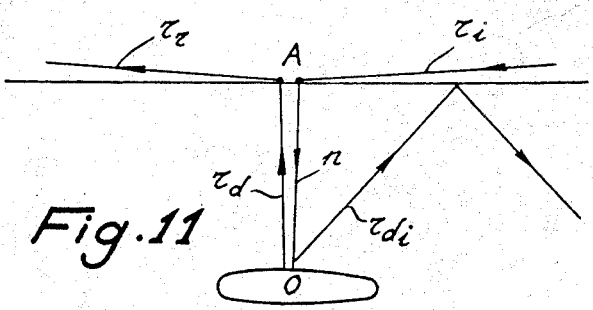
FIG. 11 is an explanatory diagram showing how such megameter waves may be used for detecting a submerged body.

A point analogous to the point A of FIG. 11 always exists on the surface of the sea in vertical alignment with an obstacle O, due to the existence of electrical fields E' and E'' the generation of which has been explained with reference to FIG. 10.

Figure 1:
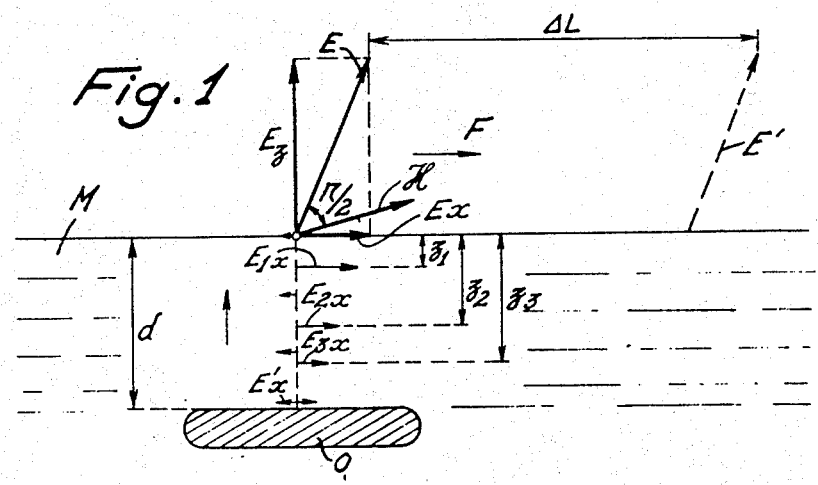
FIG. 1 is an explanatory diagram showing the detection of a submerged obstacle by the use of megameter waves, in accordance with the invention.

In fact, as illustrated in FIG. 1, the electrical field E existing at such a point A has a vertical component Ez which propagates along the surface M of the sea, while its horizontal component Ex propagates inwardly through the sea and assumes successive values $E_1x$ at a depth $z_1$, $E_2x$ at a depth $z_2$, $E_3x$ at a depth $z_3$ and so on, the attenuation sustained by the vector Ex in term of the depth $z$ being the lower as the wave frequency is lower.

The vector E'x representing the field reflected by the obstacle O along ray $r_d$ (FIG. 10) sustains attenuation as it travels towards the surface of the water, where it gives rise to an electrical vector which appears after a time $\Delta T$, at the instant when the vector E occupies a position E' after covering a distance $\Delta L$, exhibiting a phase displacement $\Delta \theta$ in relation to the emitted electrical vector E.

This phase displacement is related to the depth $d$ of the submerged obstacle 0 and to the wavelength $v_m$, for the frequency used, through the body of water, by the formula $\Delta\theta = 2\pi 2.d/vm$ (1)

In the region surrounding a vertical line passing through the obstacle, the signal reflected by the latter gives rise, firstly, to an induction field which decreases as $1/D^3$, where $D$ is the distance between the point where the measurement is made and the point through which the vertical line through the obstacle cuts through the surface of the sea, and, secondly, to a propagation field which decreases as $1/D$ and which can consequently travel great distances.

While the depth of the submerged obstacle is determined from the degree of phase displacement, as explained precedingly, the exact position of said obstacle is determined by a system of intersecting lines based on megametric-wave receiving stations.

To this end, and as shown in FIG. 2, a transmitting station 1, having a submerged antenna 2, forms a detection group having a multiplicity of receiving stations $3a$, $3b$, etc. Each of these stations is equipped with a highly sensitive directive antenna loop $4a$, $4b$, etc., preferably of the type with ferrite cores, the operating principle of which is well known per se. Such antenna loops enable the direction from which the echo off the submerged obstacle O is coming to be ascertained, providing care is taken to orientate the axis of said loop perpendicularly to the direction of the obstacle in order to obtain maximum echo amplitude.

Thus, in the case of FIG. 2, the antenna loop $4a$ of receiving station $3a$, directed at a bearing angle $\theta_1$ relative to true North gives an azimuth of $\theta'_1$ in respect of line $3a$-O. Similarly, the loop $4b$ of station $3b$ directed at an angle $\theta_2$ relative to true North gives a bearing azimuth of $\theta'_2$ for the line $3b$-O. If now the positions of the receiving stations and transmitter station, on the one hand, and the azimuths $\theta'_1$, $\theta'_2$, etc., obtained for each of these positions, on the other, be plotted on a graph drawn to scale, then the location of the obstacle O can be obtained by intersection or crossbearing. However, and as will be explained hereinbelow, the data furnished by the receiving stations $3a$ and $3b$ cannot be used without error unless the lines joining them to the transmitter 1 and those joining them to the obstacle to be detected form included angles $\alpha'_1$, $\alpha'_2$ .... comprised between 60° and 120°. To overcome this drawback, any desired number of receiving stations of the same type may be disposed to form a detection group in conjunction with a common transmitting station. In this manner, if such an angular condition is not fulfilled for a receiving station, it may be fulfilled for another.

In the example illustrated in FIG. 2, the group is arranged along a coastline 5. However, the detection group could equally well be disposed on the high seas, with the transmitting station 1m installed on a ship 6 and the receiving stations 3am and 3bm on ships 7a and 7b. It will then suffice for these three ships 6, 7a and 7b to know their respective positions accurately for the submerged O also to be located accurately relative to one of these ships taken as a datum.

The ferrite-type antenna loops of ships 7a and 7b will give the azimuths $\theta''_1$, $\theta''_2$ of the lines 3am-O and 3bm-O relative to true North, and these azimuths can be used providing the angles $\alpha''_1$ and $\alpha''_2$ are comprised between 60° and 120°. The antenna loops of land stations 3a and 3b and of naval stations 3am and 3bm are associated with phasemeters which will indicate the same depth in respect of the submerged obstacle O for all these receiving stations jointly operating as a detection group in conjunction with a common transmitting station.

The transmitting station, or transmitter, consists basically of a device for generating high power energy at the utilization wavelength and of a submerged radiating system which enables part of the energy applied to it to be radiated on the very low frequencies employed yet which involves no excessive size penalty.

The high power generator may take the form of a high power A.C. generator or of a conventional very-low-frequency valve oscillator, or alternatively of a high-power, adjustable-frequency modulator of the spark-gap type.

Figure 4:
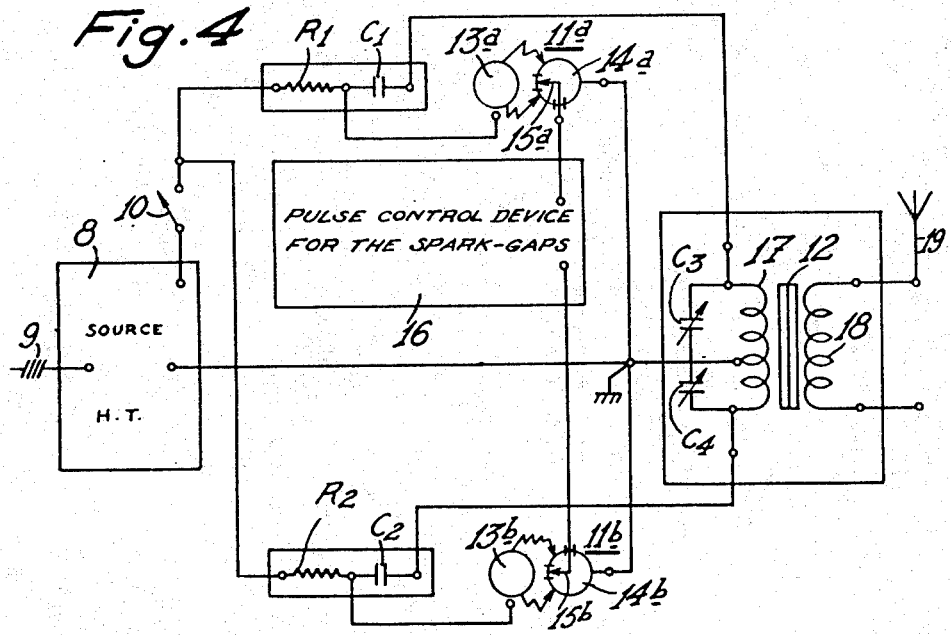
FIG. 4 is an electrical wiring diagram in respect of a transmitter, in accordance with the invention.

In the embodiment shown in FIG. 4, the transmitter consists of a high power, very-low adjustable frequency modulator of the spark-gap type. This transmitter comprises a source 8 of very high D.C. voltage, say 50 to 100 kV, supplied by the mains system 9 and capable of delivering an average current intensity of several hundred amperes. Said source comprises rectifier elements of known type which are not illustrated for the sake of clarity.

Through the medium of a switch 10, which is closed when the transmitter is utilized, said source 8 continuously charges two large and very carefully insulated capacitors $C_1$ and $C_2$ via two resistors $R_1$ and $R_2$. These capacitors have one of their ends connected to ball-type spark-gaps 11a and 11b and their other ends to a push-pull type transformer 12. The spark-gap 11a used to discharge the capacitor $C_1$ comprises two balls 13a and 14a, while the spark-gap 11b used to discharge the capacitor $C_2$ comprises two balls 13b and 14b. Balls 14a and 14b comprise auxiliary spark-gaps 15a and 15b acting as exciters which, through the action of minute, very-short-duration arcs produced by short pulses delivered by an electronic control device 16, enable powerful arcs to be triggered across the balls 13a, 14a and the balls 13b, 14b. The discharges of said capacitors $C_1$ and $C_2$ are alternated in order to generate in the primary 17 of transformer 12 an A.C. voltage the half-period of which is furnished by the time interval separating successive sparks produced in the auxiliary spark-gaps or exciters 15a and 15b. The current across the respective pairs of balls of each of spark gaps 11a and 11b is limited only by the electromotive force set up across the terminals of primary winding 17 of transformer 12. Capacitors $C_3$ and $C_4$ placed in parallel on each half-winding of said primary 17 tune the frequency of transformer 12 to the fundamental frequency obtained. The secondary winding 18 of transformer 12 provides the power supply to the antenna 19.

Figure 5A:
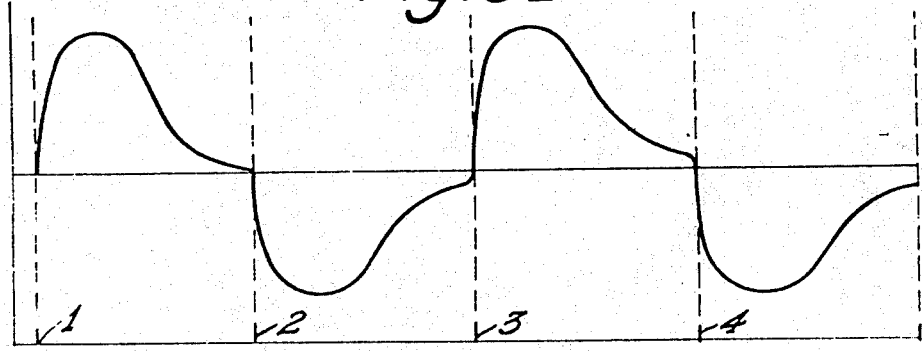
FIG. 5a is a graph in which discharges from the transmitter of FIG. 4 are plotted against voltage.
Figure 5B:
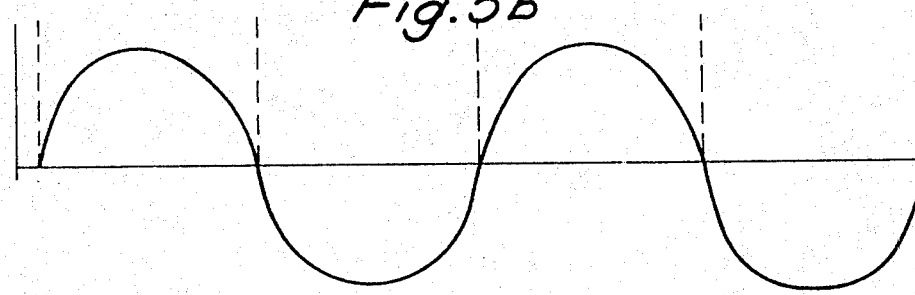
FIG. 5b shows the voltages across the terminals of the transformer associated with the transmitter in FIG. 4.

The pulses delivered by the electronic device 16 (a conventional device of a type familiar in transmitters utilizing spark-gap-type modulators) can be spaced at will and be furthermore grouped together in pulse trains in order to provide trains of pulses of high power and short duration, comprising, for example, three or four fundamental oscillations. FIG. 5a shows an example of the generation of a pulse train comprising two full cycles. Pulses 1 and 3 trigger one pair of spark gaps, and pulses 2 and 4 trigger the other pair. The discharges produced by capacitors $C_1$ and $C_2$ in each half-winding of the primary 17 of transformer 12 are of the shape shown in FIG. 5a. The tuned primary winding of said transformer enables a voltage to be obtained, a graphical illustration of which is given in FIG. 5b.

Figure 6:
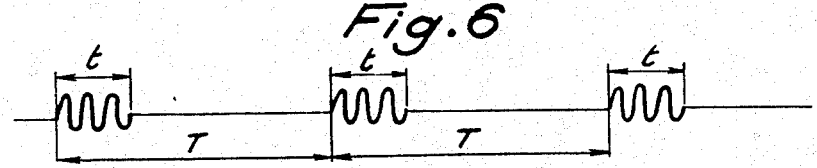
FIG. 6 shows trains of waves delivered by the modulator of the transmitter in FIG. 4.

A modulator of the type illustrated in FIG. 4 enables considerable peak power capable of reaching several thousand megawatts to be obtained. FIG. 6 shows successive pulse trains of three full cycles each furnished by the transmitter in FIG. 4, and these trains have a duration $t$ and are separated from one another by time intervals T which may reach as much as one minute in cases where it is desired to operate at very large peak powers with a medium-power, high-voltage supply system. Thus, for a frequency of 10 cycles per second for example, the pulse trains would have a duration of 0.3 second and the means power delivered to the secondary winding of the adaptor-transformer would be 5,000 kW for a peak power of 1,000 MW.

The receiving station shown in FIG. 7 may be of the land, sea or airborne type. It comprises a main directive loop 4 which may be orientated in any direction about a supporting spindle 20. If this loop 4 is obliquely orientated with respect to the transmitting station and to the submerged obstacle, it receives simultaneously signals from the transmitting station and from the submerged obstacle. A second auxiliary directive loop 21 pivotally mounted on a supporting spindle 22 is orientated towards the transmitter. If the preceding angular condition is fulfilled, i.e. the lines joining the receiver to the transmitter and to the submerged obstacle form an included angle comprised between 60° and 120°, the submerged obstacle forms with said orientated auxiliary loop 21 an angle neighboring 90°. Therefore, the echo signals received by said loop 21 are very highly attenuated and generate in said loop a negligible electro-motive force. The purpose of said loop 21 is to define the phase of the transmitted signals. Measurement of the depth $d$ of the submerged obstacle consists in isolating the echo signal and in comparing its phase with that of the transmitted signal.

To this end, the auxiliary directive loop 21 feeds into an amplifier 23 which supplies an adjustable phase-shifter 24 and a pulse generator 25 of any known type. Said phase-shifter 24 feeds into the field coil 26 of a variometer 27, the core 28 carrying said coil being rigidly connected to a spindle 29. Said spindle 29 carries a sprocket wheel 30 coupled, via a chain 31, to a sprocket wheel 32 of identical diameter carried by the spindle 22 of the auxiliary directional loop 21. Thus, when this auxiliary directional loop is orientated, its axis and that of the field coil 26 of the variometer remain rigorously parallel.

The second or receiving coil 33 of variometer 27 has its core 34 rigidly connected to a spindle 35 upon which is mounted a sprocket wheel 36 connected, by a chain 37, to a further sprocket wheel 38 of identical diameter carried by the spindle 20 of the main antenna loop 4. Thus, during orientation of said loop 4, its axis and that of coil 33 remain rigorously parallel.

The phase-shifter 24 is adjusted so that the induction field in the coil 26 is of exactly opposite phase to that of the electrical field produced by the transmitter. Thus, the electromotive force induced in the coil 33 is of exactly opposite phase to that of the electromotive force which is generated in the main loop 4 in response to the field emanating from the transmitter. When said main loop 4 is orientated in a search for maximum echo amplitude, the electromotive force induced therein in response to the transmitter field remains rigorously proportional to the electromotive force induced in coil 33 of the variometer. If, in addition, the receiving station equipped with the receiver of FIG. 7 is disposed so that the lines joining it to the transmitter and to the obstacle form an included angle comprised between 60° and 120°, as explained precedingly the electromotive force induced in the auxiliary loop 21 in response to the reflected field produced by the echo is negligible and, by adjusting the amplitude of the electromotive force furnished by coil 33, cancellation may be obtained, in an adder 40 connected to said coil 33, of the electromotive forces induced by the transmitter field in the main loop 4 and the said coil 33, respectively, regardless of the orientation of the main loop.

In fact, when only considering the signals emitted from the emitting station, the amplitude of the signals which are received by the main loop 4 will have its maximum value when said loop is orientated towards said emitting station. Say, A such a maximum amplitude after amplification by amplifier 41, if loop 4 is rotated through an angle $\Psi$ the amplitude of the signals emitted by said amplifier becomes $A \cos \Psi$.

The main loop 4 being orientated towards the emitting station, if the receiving coil 33 is rotated so that its axis coincides with that of the field coil 26 of variometer 27, the emitted signals generate in said coil an electromotive force having an amplitude $-B$.

The field coil 26 remaining stationary, a simultaneous rotation of loop 4 and coil 33 through the same angle $\Psi$ gives at the output of amplifier 41 a signal the amplitude of which is equal to $A \cos \Psi$ at the output of coil 33 a signal having an amplitude equal to $-B \cos \Psi$. These two signals are transmitted to adder 40 which furnishes signals the amplitude of which is equal to:

$$A \cos \Psi - B \cos \Psi.$$

By the adjustment of the gain of amplifier 41 in any known manner, it is possible to obtain $A = B$. In this way the signals issued from adder 40 will have an amplitude equal to zero whatever $\Psi$ may be, since $$A \cos \Psi - \cos \Psi = 0 \qquad (2).$$

In the case where for a receiving station said relation 2 is not fulfilled, when the rotating loop 4 of said station passes in alignment with the emitter, the lines joining said receiving station to the emitter and to the submerged obstacle form an included angle either less than 60° or greater than 120°. The electromotive force thus remaining in adder 40 oppose the electromotive force generated by the echo signals received by the main loop 4 and transmitted to said adder, which hinders from utilizing said receiving station for detecting said obstacle.

When an echo, obtained by the reflection off the submerged obstacle of the horizontal component of the electrical field of the megameter waves emitted by the transmitter, is received in the main loop 4, the signal is immediately amplified by an amplifier 41 and then applied to the adder 40, and this signal finds no opposing electromotive force in said adder, provided that the previously specified conditions of angular spacing between the receiver-to-transmitter and receiver-to-obstacle lines are met. The main loop 4 can therefore be orientated at an angle $\theta$ in order that it shall receive echo signals of maximum amplitude. Amplifier 41 is further connected to an oscillograph 42 providing visualization of the echo and to the loop-orientating-device enabling maximum amplitude to be obtained. The signal emerging from adder 40 operates a pulse generator 43, an integrator 44 and, ultimately, a phasemeter 45 which provides a direct reading of the depth $d$ at which the obstacle is submerged. The amplifiers 23 and 41, the phase-shifter 24, the adder 40, the oscillograph 42, the pulse generators 25 and 43, the integrator 44 and the phasemeter 45 are supplied with current in any conventional manner. Being entirely conventional in every respect, these various pieces of apparatus will not be described in detail.

FIG. 8 provides a clear understanding of the manner of operation for the receiving device shown in FIG. 7. The transmitted signal $e$ shown in this figure has a duration $t$ and is assumed to comprise three full cycles. By means of the pulse generator 25, pulses 1, 3, 5 are obtained which are initiated exactly at the instants of passage across the zero-line of the sinusoidal signal of duration $t$. The pulse generator 43, which receives obstacle-reflected trains of phase-displaced waves, represented by the sinusoidal signal $o$ in FIG. 8, enables pulses 2, 4, 6 to be initiated precisely at the points of crossing of the zero-line by the sinusoidal signal $o$ of the pulse train representing the signal reflected by the submerged obstacle. The pulses 2, 4 and 6 are phase-displaced in relation to pulses 1, 3, 5 by quantity $\Delta\theta$ defined hereinabove with reference to formula (1). The pulses 1, 3, 5, produced by pulse generator 25, and 2, 4, 6 produced by pulse generator 43 are applied to the integrator 44, in which the phase differences $\Delta\theta$ are converted into direct current by conventional methods well known per se, and subsequently supplied to the phasemeter 45 gives a direct reading of the depth $d$ of the submerged obstacle.

It is to be clearly understood that many modifications suggested by technology or practical considerations may be made to the present invention without departing from its scope as defined in the appended claims. As an example, the directive antenna loops may be of any well-known type, but preferably of the type using ferrites. Similarly, the mechanical drive between individual directive loops and the corresponding variometer coil may be executed in a manner different from that shown in FIG. 7, any known method being suitable provided rigorous parallelism is ensured between the axis of each loop and that of the variometer coil. Lastly, it is possible to use a plurality of transmitters $lx, ly, lz, \ldots$, (FIG. 12) having submerged antenna and operating at different frequencies X c/s, Y c/s, Z c/s, ... In this manner, signals variously phase-displaced may be received without mutual jamming between the transmitters at several receiving stations $3d, 3e, 3f, 3g, 3hm, \ldots$

What we claim is:

1. A method of detecting bodies which are submerged into a liquid mass, by means of megameter radio waves generating on the surface of said liquid mass a plurality of electric fields slightly inclined in their propagation direction and the horizontal component of which vertically propagates inwardly of said liquid mass, which consists in transmitting at the surface of the liquid mass, megameter radio waves of the aforementioned character, simultaneously receiving in a plurality of receiving stations spaced from each other said emitted waves and the waves obtained by reflection, on a submerged obstacle to be detected, of the vertically propagated horizontal component of the electric field existing in vertical alignment with said obstacle, determining at each receiving station the included angle formed by the lines joining said station to the wave emission and to the obstacle, measuring at the receiving stations for which said included angle is comprised between 60° and 120°, on the one hand, the phase-shift between the emitted and reflected waves and, on the other hand, the bearing angle formed by the direction for which the reception of the reflected waves is maximum and a stationary direction which is similar for all the receiving stations, determining by the cross-bearing method the geographical position of said obstacle by utilizing the thus measured bearing angles, and computing the depth of said obstacle from said measured phase-shift.

2. A method according to claim 1, wherein several different frequencies are used for transmission.

3. A group for detecting bodies which are submerged into a liquid mass, by mass of megameter radio waves generating on the surface of said liquid mass a plurality of electric fields slightly inclined in their propagation direction and the horizontal component of which vertically propagates inwardly of said liquid mass, comprising, in combination, at least one megameter wave-transmitting station consisting of a device for generating high power electrical energy at a very low frequency ranging from 1 to 100 c/s and of a submerged radiating system connected to said generating device; and a multiplicity of receiving stations spaced from each other and each one of which comprises two directive antenna loops the first one of which is orientated towards one transmitting station for receiving the waves emitted thereby while the second loop may be orientated in azimuth for simultaneously receiving the waves emitted by said transmitting station and the waves obtained by reflection, on a submerged obstacle to be detected, of the vertically propagated horizontal component of the electric field existing in vertical alignment with said obstacle, means for orientating said loops, a depthwise-graduated phasemeter, a first electrical interconnecting means between said phasemeter and the first loop, means connected to said first electrical interconnecting means and generating an electromagnetic field of exactly opposite phase to that of the electromagnetic field generated by the submerged radiating system of said transmitting station and received by said first antenna loop, and a second electrical interconnecting means between said phasemeter and said antenna loop having means sensitive to said electromagnetic field of opposite phase for rendering null the electromotive force induced into said second loop by the electromagnetic field from said transmitting station when the lines joining said receiving station to said transmitting station and to said submerged obstacle form an included angle comprised between 60° and 120°.

4. A detection group according to claim 3, wherein at lest one transmitting station is on land.

5. A detection group according to claim 3, wherein at least one transmitting station is at sea.

6. A detection group according to claim 3, wherein at least one receiving station is on land.

7. A detection group according to claim 3, wherein at least one receiving station is at sea.

8. A detection group, according to claim 3, wherein the device for generating high power electrical energy at a very low frequency comprises a source of alternating current at very low frequency ranging from 1 to 100 c/s, and a transformer having a primary winding connected to said source and a secondary winding connected to the submerged radiating system, the said primary and secondary windings being designed to fully match the load represented by the impedance across said source of current and said radiating system.

9. A detection group according to claim 8, wherein the submerged radiating system comprises two metal floats spaced from each other by several kilometers, two fully-immersed electrodes of large size respectively supported by said floats, an insulated surface cable interconnecting one end of the secondary winding of the transformer and the electrode which is the closest to said transformer, and an insulated cable immersed at great depth in the liquid mass and interconnecting the other electrode and the other end of said secondary winding.

10. A detection group according to claim 9, wherein the second amplifier supplies a visualization and adjustment oscillograph.

11. A detection group according to claim 8, wherein the high-power energy generating device consists of a very-low-frequency high-power A.C. generator.

12. A detection group according to claim 8, wherein the high-power energy generating device consists of a very-low-frequency conventional valve oscillator.

13. A detection group according to claim 8, wherein the high-power energy generating device consists of an adjustable very-low-frequency modulator with high-power spark gaps.

14. A detection group according to claim 13, wherein the spark-gap modulator comprises two large and insulated main capacitors, a very-high-voltage D.C. source supplying current of very great intensity, two resistors respectively interconnecting said D.C. source and one end of said main capacitors, two ball-type spark-gaps respectively connected to said one end of said capacitors and having auxiliary spark-gaps acting as exciters, a control-pulse-generating electronic device connected to said auxiliary spark-gaps, a push-pull type transformer having a secondary winding connected to the submerged radiating system and a primary winding the ends of which are respectively connected to the other ends of said main capacitors while its center point is simultaneously connected to said D.C. source and to said auxiliary spark-gaps, and adjustable capacitors mounted in parallel on the half-windings of said primary winding for tuning the frequency of said transformer to the fundamental frequency given by the ball-type spark-gaps.

15. A detection group according to claim 3, wherein that the directive receiving antenna loops are ferrite-type antenna loops.

16. A detection group according to claim 3, wherein the first and second electrical interconnecting means and the means for generating an electromagnetic field of opposite phase comprise a first amplifier connected to the first directive antenna loop, a variometer having a field coil and a receiving coil, a phase-shifter fed by said first amplifier and connected to said field coil, means for mechanically connecting the first directive antenna loop and said field coil to maintain their axes in accurate parallelism, means for mechanically connecting the second directive antenna loop and said receiving coil to maintain their axes in accurate parallelism, an adder connected to said receiving coil, a second amplifier interconnecting said adder and said second loop, two pulse generators respectively connected to said first amplifier and to said adder, an integrator connected to said pulse generators and to the phasemeter in order to convert in direct current the phase difference between the signals issuing from said pulse generators for supplying the phasemeter with said direct current, the reading of said phasemeter being usable only in the case where the angular spacing between the receiver-to-transmitter and receiver-to-obstacle lines is comprised between 60° and 120°.

* * * * *